United States Patent
Aiello et al.

(10) Patent No.: US 9,939,277 B2
(45) Date of Patent: *Apr. 10, 2018

(54) SYSTEM AND METHOD FOR RECOMMENDING PLEASANT ROUTES FROM THE SENTIMENT OF GEO-TAGGED PHOTOGRAPHS

(71) Applicant: Yahoo!, Inc., Sunnyvale, CA (US)

(72) Inventors: Luca Maria Aiello, Barcelona (ES); Daniele Quercia, Barcelona (ES); Rossano Schifanella, Turin (IT)

(73) Assignee: Yahoo Holdings, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,724

(22) Filed: Aug. 8, 2016

(65) Prior Publication Data
US 2016/0349065 A1    Dec. 1, 2016

Related U.S. Application Data (63) Continuation of application No. 14/271,960, filed on May 7, 2014, now Pat. No. 9,410,816.

(51) Int. Cl.
*G01C 21/36* (2006.01)
*G01C 21/34* (2006.01)
*G06N 5/04* (2006.01)
*G06N 7/00* (2006.01)

(52) U.S. Cl.
CPC ..... *G01C 21/3407* (2013.01); *G01C 21/3453* (2013.01); *G01C 21/3476* (2013.01); *G01C 21/36* (2013.01); *G01C 21/3676* (2013.01); *G01C 21/3682* (2013.01); *G06N 5/04* (2013.01); *G06N 7/005* (2013.01)

(58) Field of Classification Search
CPC .... G01C 21/36; G01C 21/34; G01C 21/3476; G01C 21/3407; G01C 21/3453; G01C 21/3676; G01C 21/3682; G06N 5/04; G06N 7/005
USPC ......................................... 701/533
See application file for complete search history.

(56) References Cited

U.S. PATENT DOCUMENTS

2015/0285652 A1* 10/2015 Peri .................... G01C 21/3476
                                                            701/438

* cited by examiner

*Primary Examiner* — Richard M Camby
(74) *Attorney, Agent, or Firm* — Cooper Legal Group, LLC (57) ABSTRACT

A system and method generates and recommends a short and pleasant path between a source s and destination d in a geo-location such as a city or city center. The routes are not only short but emotionally pleasant, offering an engaging user experience, going beyond just showing paths on a map.

20 Claims, 7 Drawing Sheets

SYSTEM AND METHOD FOR RECOMMENDING PLEASANT ROUTES FROM THE SENTIMENT OF GEO-TAGGED PHOTOGRAPHS

CROSS-REFERENCE TO RELATED APPLICATIONS

This application claims priority to and is a continuation of U.S. application Ser. No. 14/271,960, filed on May 7, 2014, titled "SYSTEM AND METHOD FOR RECOMMENDING PLEASANT ROUTES FROM THE SENTIMENT OF GEO-TAGGED PHOTOGRAPHS", which is incorporated herein.

STATEMENT REGARDING FEDERALLY SPONSORED-RESEARCH OR DEVELOPMENT

None.

FIELD

The disclosed subject matter broadly relates to the field of navigation, and more particularly relates to the field of route recommendation for both vehicles and pedestrians.

BACKGROUND

When providing directions to a place, web and mobile mapping devices are all able to able to suggest the shortest route between the source s and the destination d. Although that information is very useful, there are times when we would prefer to take the route that offers beautiful scenery and this may not necessarily be the fastest route. Especially when walking, one may prefer a route meandering through narrow tree-lined streets rather than a shorter route through large avenues with car traffic.

Web and mobile mapping services do not go beyond offering the route between two locations that is shortest.

SUMMARY

Briefly, according to an embodiment of the present a method generates and recommends a short and pleasant path between a source s and destination d in a geo-location such as a city or city center. The routes are not only short but emotionally pleasant, offering an engaging user experience, going beyond just showing paths on a map. The method proceeds by: receiving the source address s and the destination address d; building a location graph with nodes representing sites within the city; computing a pleasantness score for the nodes; selecting a route from the source s to the destination d that has a highest pleasantness score; and presenting the selected route on a map.

According to another embodiment of the disclosed subject matter, an information processing system with a processor device operably coupled with a memory is configured to execute the method steps above.

According to another embodiment of the disclosed subject matter, a computer program product includes a computer-readable storage medium with computer-executable instructions stored therein for executing the method steps above.

BRIEF DESCRIPTION OF THE SEVERAL VIEWS OF THE DRAWINGS

To describe the foregoing and other exemplary purposes, aspects, and advantages, we use the following detailed description of exemplary embodiments of the disclosure with reference to the drawings, in which.

While the disclosed subject matter as claimed can be modified into alternative forms, specific embodiments thereof are shown by way of example in the drawings and will herein be described in detail. It should be understood, however, that the drawings and detailed description thereto are not intended to limit the disclosed subject matter to the particular form disclosed, but on the contrary, the intention is to cover all modifications, equivalents and alternatives falling within the scope of the disclosed subject matter.

DETAILED DESCRIPTION

Before describing in detail embodiments that are in accordance with the present disclosure, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a system and method to recommend a short and pleasant path between a source s and destination d in a geo-location such as a city or city center. We generate routes that are not only short but emotionally pleasant, offering an engaging user experience, going beyond just showing paths on a map. The method makes use of novel functions in mapping tools (e.g., Yahoo Maps) and travel services (e.g., Yahoo Travel). We are able to automatically suggest routes that are not only short but also emotionally pleasant, providing a sense of happiness, beauty, and quietness between any pair of points in a city.

We collect reliable perceptions of urban scenes, incorporating them into algorithmic solutions applied to locales.

Figure 6:
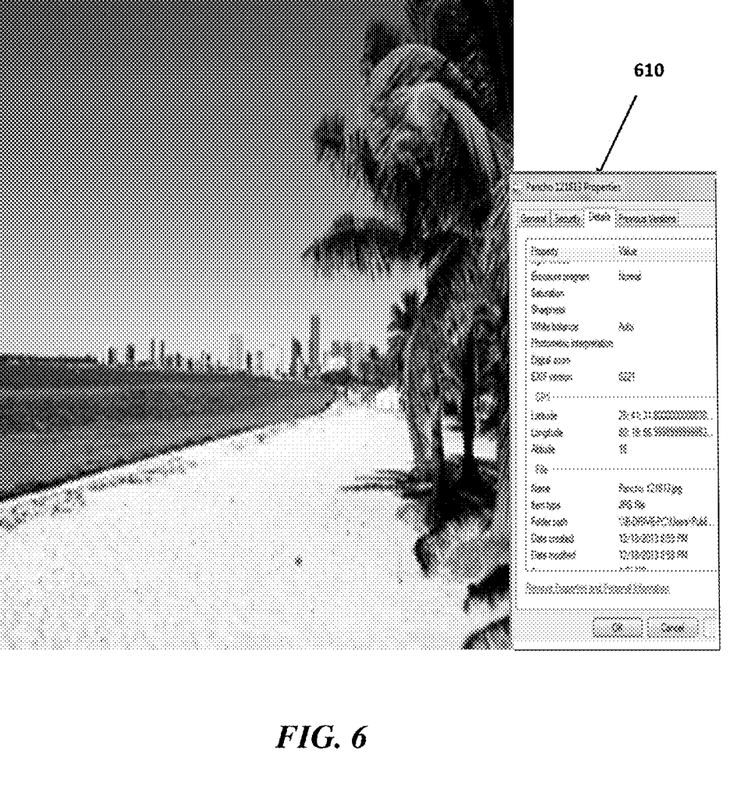
FIG. 6 shows a photograph and its geo-coordinates, according to the known art.

Our method is based on a new formula to extract the pleasantness of geographical locations from sources such as geo-tagged photos, combined in a novel way with an algorithm to extract the k shortest paths on a graph. A geo-tagged photo is a photograph associated with the location where the photo was taken. Often the location is "tagged" to the photo as a longitude and latitude. All you need to produce a geo-tag for a photograph is a camera combined with GPS. FIG. 6 shows the geo-coordinates 610 of a photograph taken with a mobile phone. Since most smart phones are equipped with both a camera and GPS, we are seeing an increase in the amount of geo-tagged photos uploaded to sites such as Flickr®, an online photo management and sharing site owned by Yahoo!®. We can automatically access the photos from online sites and gather statistics from the photos in order to calculate pleasant routes.

This disclosure presents a new way to recommend pleasant path alternatives on any online map application, which are especially suited for mobile devices. More generally, it provides an alternative way of ranking any type of geo-referenced content, including geo-referenced Flickr® pictures, and of offering such a content to mobile phone users depending on their current location.

Figure 5:
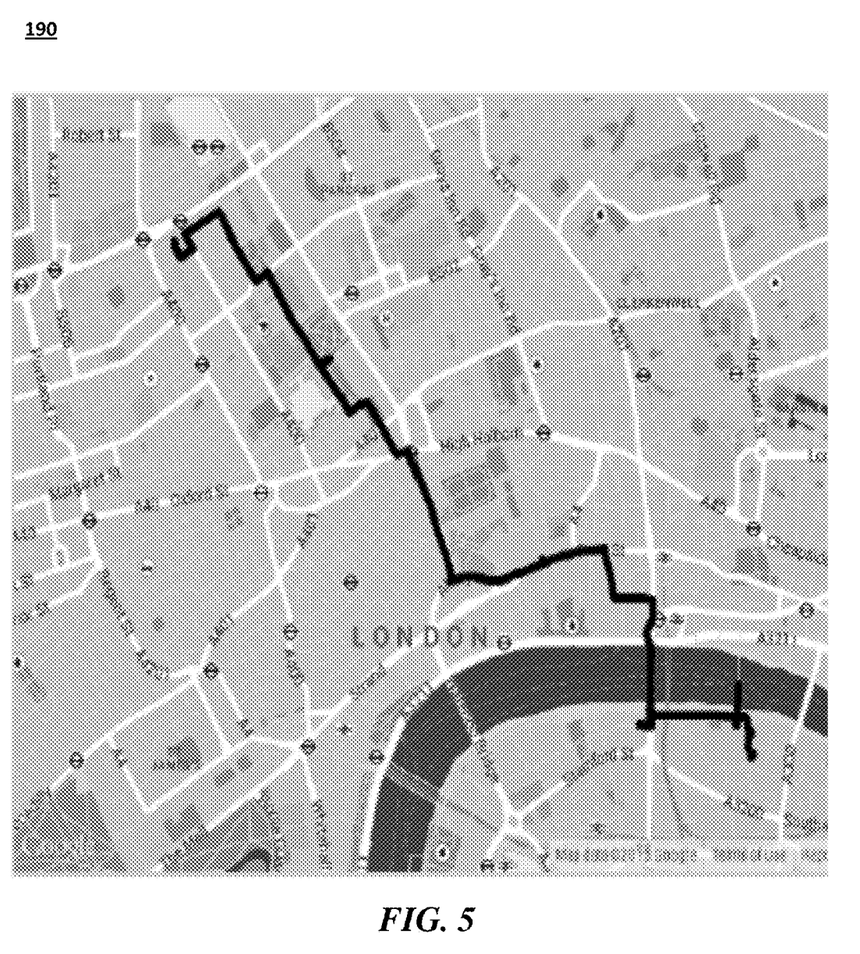
FIG. 5 shows a pleasant route, according to an embodiment of the present disclosure.

We rely on crowd-sourced measurements of people's emotional experience of the city and use those measurements to propose ways of recommending urban routes that are alternatives to existing approaches. Despite emotional responses being subjective and difficult to quantify, urban studies have repeatedly shown that specific visual cues in the city context are consistently associated with the same fuzzy concept (e.g. with beauty) (De Botton 2008; Peterson 1967; Quercia, O'Hare, and Cramer 2014; Salesses, Schechtner, and Hidalgo 2013). For example, green spaces and Victorian houses are mostly associated with beauty, while trash and broken windows are associated with ugliness. To date, there has not been any work that considers people's emotional perceptions of urban spaces when recommending routes to them. As part of the process, reliable perceptions of urban scenes are collected, incorporating them into algorithmic solutions. The output is the visualization on a map of a walkable, pleasant path 190 between source and destination.

Figure 1:
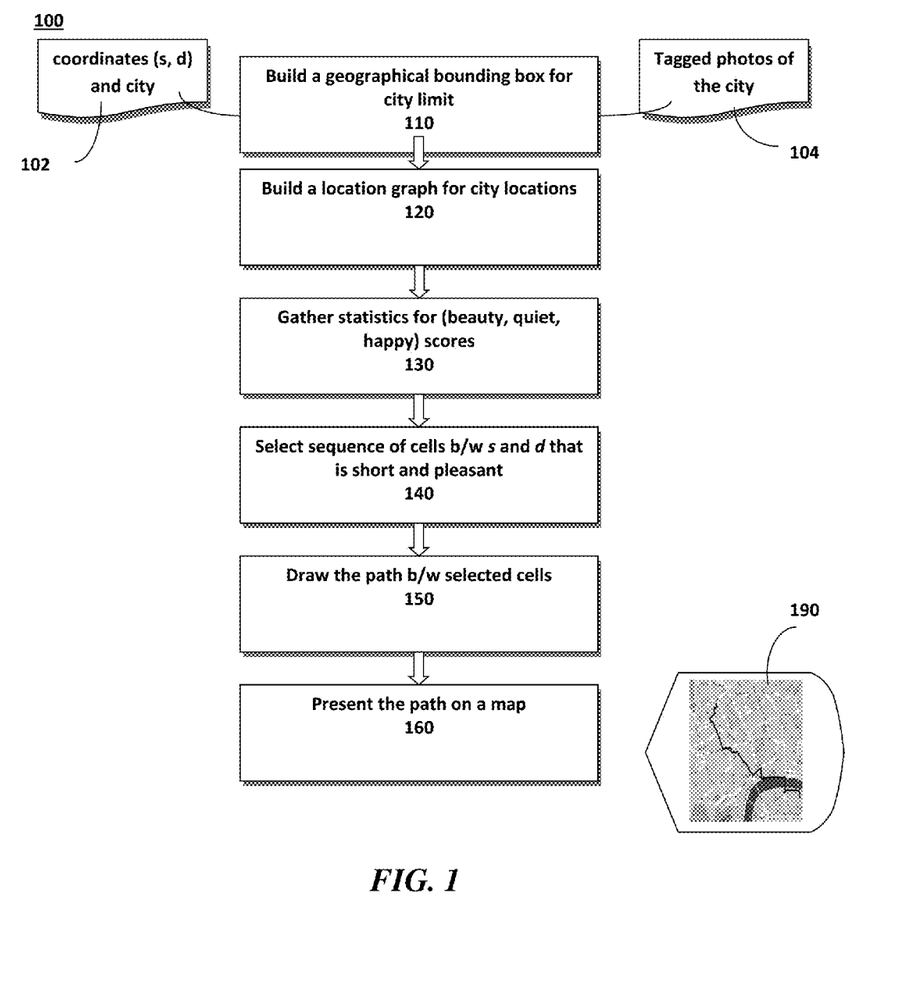
FIG. 1 is a high-level flowchart of the method for recommending pleasant routes, according to an embodiment of the present disclosure.

Referring now to the drawings in general and to FIG. 1 in particular, there is shown a flowchart 100 of a method for recommending a pleasant route, according to an embodiment of the present disclosure. The inputs to the process are: a) a pair of geographic coordinates 102 within a city source (source s and destination d); and b) geo-referenced photos 104 with tags for that city (e.g., Flickr® photos). The metadata found in geo-tagged photos can include information such as average time spent at a location and location popularity; information which we leverage for our calculations.

Once we receive the inputs 102 and 104, the process builds a geographical bounding box containing the city limit in step 110. The bounding box is described in the discussion of FIG. 7. In step 120 we generate a location graph within the bounding box whose nodes are all locations within the designated city. The edges connect neighboring locations.

Next, in step 130 we gather statistics to extract a score of location pleasantness for each of the sites within the location graph. In step 140 we select the sequence of cells between source s and destination d from the bounding box that strikes the right balance between being short and being pleasant. In step 150, given the ordered sequence of cells comprising the "pleasant" path, we draw a walkable path from s to d to encompass the selected sequence of cells. In step 160 we connect the cells using any map API (such as Yahoo, Bing or Google Maps), to present the recommended path visualized on a map 190. An example output of our method is the trace of a short path between Euston Square and Tate Modern in London that offers beautiful sceneries. See FIG. 5.

Figure 2:
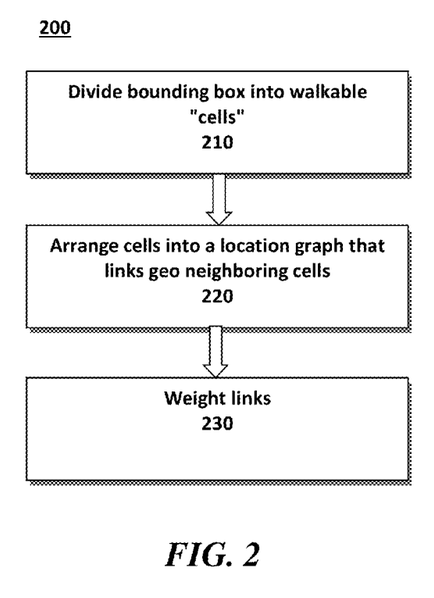
FIG. 2 is a flowchart of the process for building a location graph, according to an embodiment of the present disclosure.

Referring now to FIG. 2, we show a flowchart 200 of the process steps for building the graph for city locations (Step 120 from FIG. 1). In step 210, given the geographical bounding box containing the city limit, we divide it into "walkable" cells, each of which can be 200×200 meters in size. Previous research has established that 200 m tends to be the threshold of walkable distance in urban areas. Such a distance would typically be covered by a 2.5-minute walk. For an example, we use central London with a travel zone of $1^5$. A bounding box of Central London would generate 532 walkable cells. In dense parts of London, such a distance would typically correspond to two blocks that could be covered by a 2.5-minute walk. To obtain a finer resolution of the path, a thinner grid (e.g., 50×50 can be used). The bounding box is overlaid with the city map.

In step 220 we then arrange those cells into a location graph that links geographic neighboring cells. Since a boundary cell would have less than eight neighbors, we link the boundary cell to a number of additional closest cells within the grid such that, as a result, it would link to eight nodes in all. Each node has thus eight neighbors. The links are weighted with the geographic distance between cell centroids in step 230.

Figure 3:
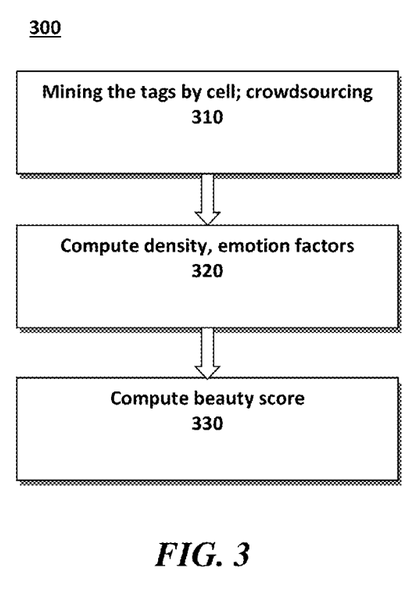
FIG. 3 is a flowchart of the process for computing a beauty score, according to an embodiment of the present disclosure.

Referring now to FIG. 3 there is shown a flowchart 300 detailing the process steps required to compute a pleasantness score for the nodes within the cells (Step 130 from FIG. 1). To quantify the extent to which a node reflects a pleasant location, we need to capture the way people perceive that location. To quantify the extent to which urban locations are pleasant, we also use data from a crowd-sourcing platform. In step 310 we can do so by mining the tags attached to photos taken in that cell; processing tags associated with the geo-tagged photos to capture words expressing emotional and cognitive perceptions of the node; predicting beauty scores for each of the nodes we gather statistics for: number of pictures (density), number of views, of favorites, of comments, and of tags received by those photos; processing the tags to capture words expressing people's emotional and cognitive perceptions.

Given a set of such photos, we compute: density=number of pictures in that cell in step 320. We further compute:

f_p=fraction of tags conveying positive emotions according to the LIWC dictionary (specifically: 'posemo')

f_n=fraction of tags conveying negative emotions according to the LIWC dictionary;

from these three values, in step 330 we compute a beauty score for that cell along three dimensions (beautiful, quiet, and happy) as follows:

$$\text{beauty}=0.37+(0.03**\log(\text{density}))+(0.20*f\_p)-(0.21*f\_n)$$

$$\text{quiet}=0.74-(0.03*\log(\text{density}))-(0.35*f\_p)-(0.34*f\_n)$$

$$\text{happy}=0.46+(0.01\ \log(\text{density}))-(0.35*f\_p)+(0.10*f\_n)$$

We compute the correlations between each pairwise combinations of the three qualities. All correlations are statistically significant (all p-values are <0.0001) and are the following: happy-quiet has r=0.29, quiet-beauty r=0.33, and beauty-happy is r=0.64. Studies have shown that the strongest affiliation is that between beauty and happiness, so we should expect that the paths we will recommend for beauty and those for happiness will partly overlap at times. We estimated the coefficients have with a linear regression of the values extracted from geo-tagged photos against the ground truth of beauty scores produced through crowdsourcing.

We can also use data gathered from a crowdsourcing web site to assess the extent to which different city's locations are perceived to be beautiful, quite, and make people happy. One such site is UrbanGems.org, which picks out two random urban scenes and asks users which one of the two is more beautiful, quite, and happy. This site does not use Flickr® images, instead using two sources in which pictures are of comparable quality: Google Street View and Geograph pictures provided by volunteers. In crowd-sourcing, we consider votes from more than 3.3K individuals and translate them into quantitative measures of location perceptions. We arrange those locations into a graph upon which we learn pleasant routes.

Figure 4:
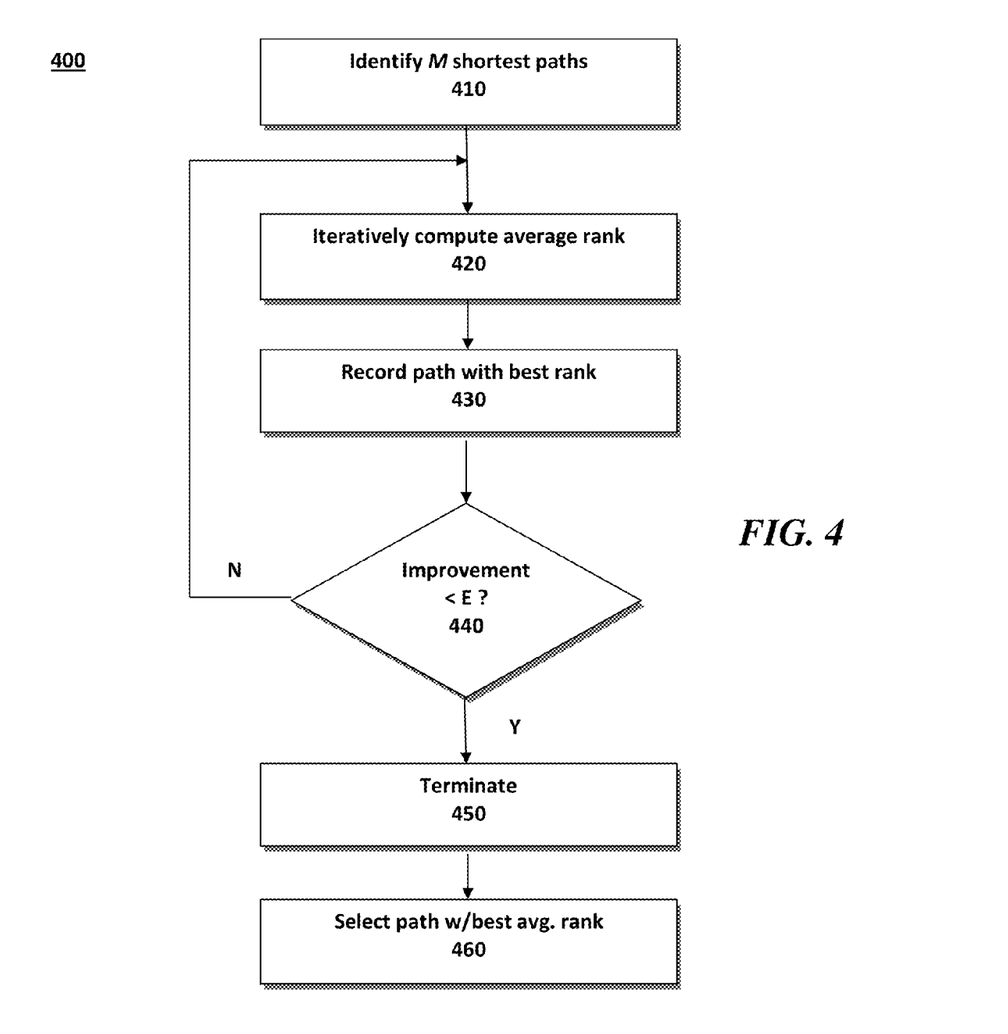
FIG. 4 is a flowchart of the process for selecting a short and pleasant route from the location graph, according to an embodiment of the present disclosure.

Referring now to FIG. 4, there is shown a flowchart 400 of the process steps required to select the sequence of cells between s and d that provides a short and pleasant path. We begin with the location graph and the calculated likelihood of visiting each node in the location graph. In step 410, we need to identify M shortest paths between source and destination on the location graph. To identify them, we use Eppstein's algorithm and find the M shortest paths connecting each pair of nodes s and d. To be sufficiently "exhaustive" we initially set M to be as high as $10^6$. This choice makes it possible to explore the full set of solutions, including any of the solutions that an alternative approach might return (e.g., an orienteering algorithm). For computational tractability, we do not consider all the M paths at once but iteratively explore the first m paths.

In step 420, we compute the average rank for all locations in each of the first m paths (with m<=¶ M). To rank a location, we need to compute the likelihood that it will be visited because it is pleasant. One simple way of expressing that is with p(go\happy) is proportional to p(happiness\go). The probability p(happiness\go) captures the idea that individuals visit locations that make them happy. To this end, we need to measure a location's happiness, and we do so resorting to our crowdsourced scores. Each score ranges from 0 to 1 and is used to model the idea that, if location i tends to be visited, then it is likely to be associated with a happiness score $h_i$ that is higher than those of unvisited locations. More specifically, we compute p(happiness=$h_i$\go) with a family of happiness curves. That is, given the crowdsourced happiness score $h_i$ for cell i, we compute the corresponding probability with a family of curves. This translates into saying that a location is likely to be visited if it makes people happy ($h_i$).

At each exploration, in step 430 we record the path with the lowest (best) average rank. Such a path exploration has diminishing returns: the more paths we consider (the higher m), the less likely the best rank will change. This suggests that it is not necessary to compute all M paths but we can explore a tiny subset of them without loss of performance, and that is what the next step does. In step 440, determine whether we should continue or terminate. This decision is based on whether or not we have reached the point of diminishing returns, that is, when the average rank improves less than epsilon ϵ. To select epsilon ϵ, we use The Marginal Value Theorem (MVT). This is an analytical tool for optimizing the trade-off between benefit (rank improvement ▪ rank) and cost (exploration of the first m paths). One can show analytically that, for the function of rank vs. m, it is best to keep increasing m only until delta(▪ rank)/delta(m) =rank/m after that, one should terminate in step 450.

We then select the path among those considered that has the best average rank in step 460. We repeat the above steps for each of the three ranks (beauty, quiet, happy), obtaining three paths between s and d in addition to the shortest one, which is our baseline.

Bounding Box and Location Graph.

Figure 7:
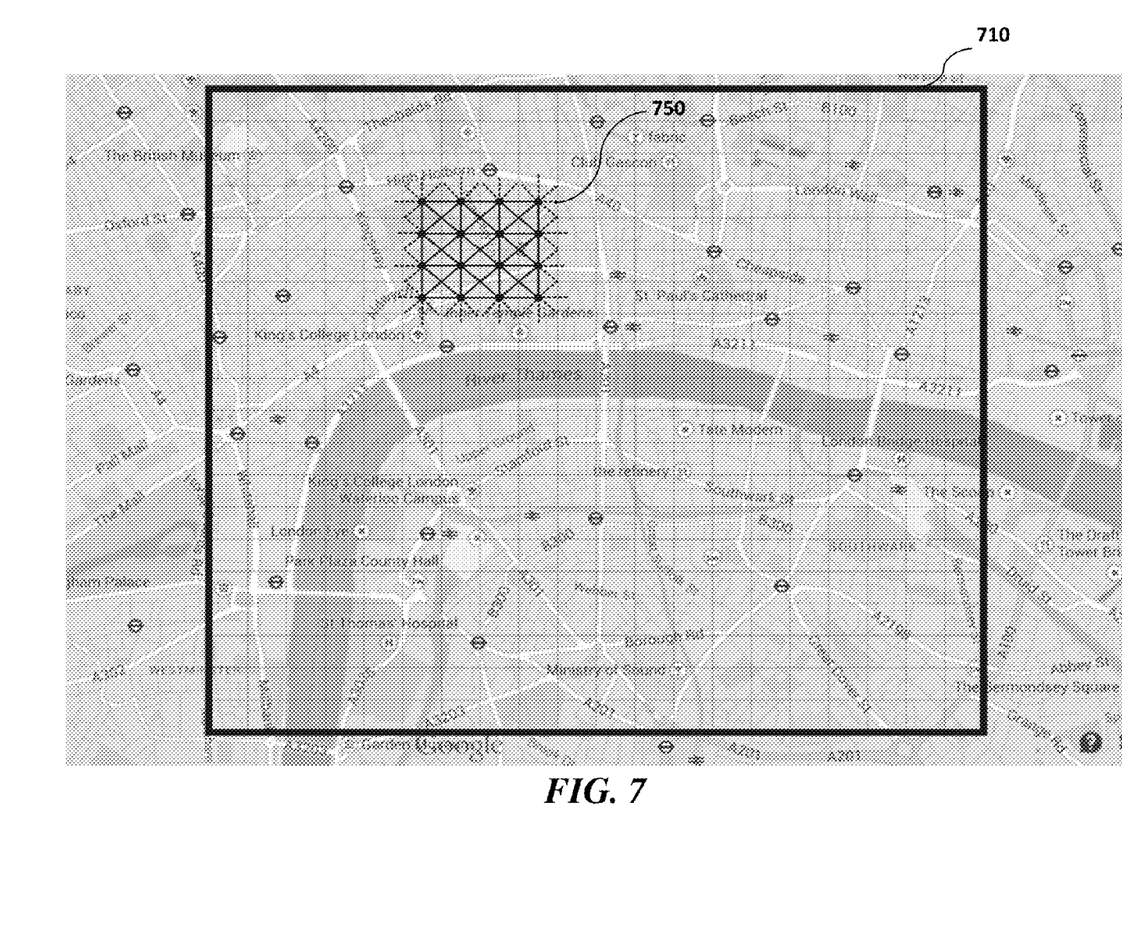
FIG. 7 shows an exemplary illustration of a bounding box overlaid with a map, according to an embodiment of the present disclosure.

Referring now to the FIG. 7 we show an exemplary illustration of a bounding box 710, according to an embodiment of the present disclosure. The bounding box 710 is a rectangle defined by a grid of geographic coordinates (longitude, latitude of the upper-left corner+longitude, latitude of the lower-right corner). Each element (square) within the grid is a cell. A location graph 750 is also shown in the upper area to the right of center in the bounding box 710. The location graph 750 is a set of black dots representing nodes placed in the center of each cell and connected with the dots in all of the eight neighboring cells. Note that the location graph 750 is normally drawn over the entire bounding box 710, but only a portion is shown here for simplicity.

Benefits and Advantages of the Disclosure:

1. Better route recommendation, at low additional cost. Our method is able to output recommended paths that are perceived up to 35% more pleasant than the shortest one, and just 12% longer, on average.

2. Algorithm Scalability. The algorithm is very scalable. The complexity for the creation of the graph is negligible: it is linear with the number of nodes, has to be computed just once for every city (and could then be reused), and computations can be done offline. Computing the scores uses Eppstein's algorithm, which is efficient as its complexity for computing a single path from source to destination is $O(e+n*\log(n)+m*\log(m))$, where n is the number of nodes, e is the number of edges, and m is the number of paths that are explored (e.g., in our experiments for Boston our m was just 700 on average).

Monetization.

A system for recommending pleasant routes can be provided as a stand-alone product or as a wrapper around a navigation application (app). The pleasant route navigation system can be provided for a fee payment or on a subscription basis. In another embodiment, advertisements can be served together with the map showing the pleasant route.

Hardware Embodiment

Figure 8:
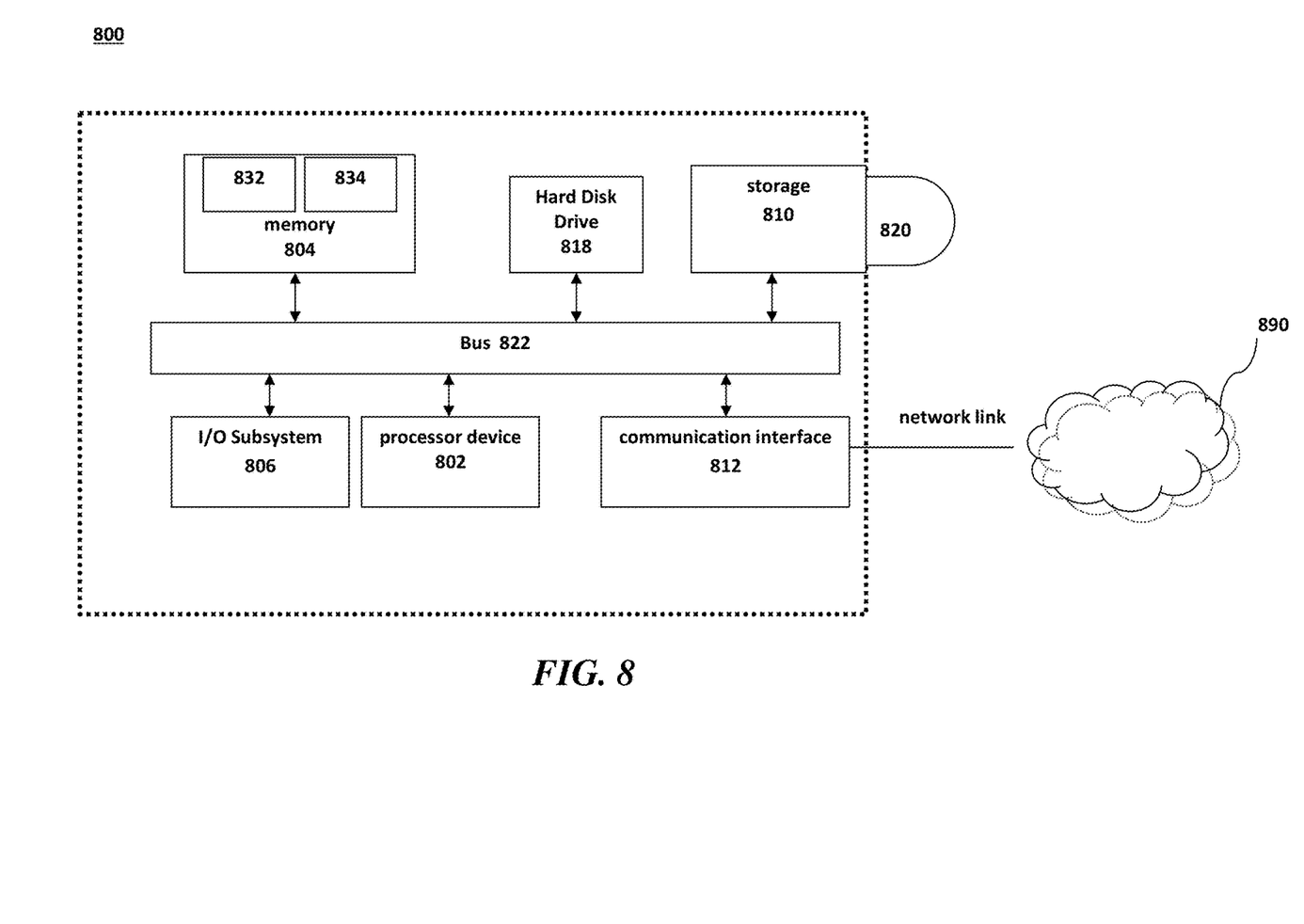
FIG. 8 is a simplified block diagram of the hardware components required to implement a method for recommending pleasant routes, according to an embodiment of the present disclosure.

Referring now in specific detail to FIG. 8, there is provided a simplified pictorial illustration of a device 800 configured for generating and processing pleasant routes from geo-tagged photographs, in which the present disclosure may be implemented. For purposes of the disclosed subject matter, computer system 800 may represent any type of computer, information processing system or other programmable electronic device, including a client computer, a server computer, a portable computer, a tablet device, an embedded controller, a personal digital assistant, a Cloud computing device, TV Internet, and so on.

The computer system 800 may be a stand-alone device or networked into a larger system. Computer system 800, illustrated for exemplary purposes as a networked computing device, is in communication with other networked computing devices (not shown) via network 810. As will be appreciated by those of ordinary skill in the art, network 810 may be embodied using conventional networking technologies and may include one or more of the following: local area networks, wide area networks, intranets, public Internet 890 and the like.

Throughout the description herein, an embodiment of the disclosure is illustrated with aspects of the disclosed subject matter embodied solely on computer system 800. As will be appreciated by those of ordinary skill in the art, aspects of the disclosure may be distributed amongst one or more networked computing devices which interact with computer system 800 via one or more data networks such as, for example, network 810. However, for ease of understanding, aspects of the disclosed subject matter have been embodied in a single computing device—computer system 800.

Computer system 800 includes processing device 802 which communicates with an input/output subsystem 806, memory 804, storage 810 and network interface. The processor device 802 is operably coupled with a communication infrastructure 822 (e.g., a communications bus, cross-over bar, or network). The processor device 802 may be a general or special purpose microprocessor operating under control of computer program instructions 832 executed from memory 804 on program data 834. The processor device 802 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 804 may be partitioned or otherwise mapped to reflect the boundaries of the various memory subcomponents. Memory 804 may include both volatile and persistent memory for the storage of: operational instructions 832 for execution by the processor 802, data registers, application storage and the like. Memory 804 preferably includes a combination of random access memory (RAM), read only memory (ROM) and persistent memory such as that provided by a hard disk drive 818. The computer instructions/applications that are stored in memory 804 are executed by processor 802. The computer instructions/applications 832 and program data 834 can also be stored in hard disk drive 818 for execution by processor device 802.

The I/O subsystem 806 may comprise various end user interfaces such as a touch screen display, a keyboard, and a mouse. The I/O subsystem 806 may further include a connection to a network such as a local-area network (LAN) or wide-area network (WAN) such as the Internet 800.

The computer system 800 may also include a removable storage drive 810, representing a floppy disk drive, a magnetic tape drive, an optical disk drive, etc. The removable storage drive 810 reads from and/or writes to a removable storage unit 820 in a manner well known to those having ordinary skill in the art. Removable storage unit 820, represents a floppy disk, a compact disc, magnetic tape, optical disk, CD-ROM, DVD-ROM, etc. which is read by and written to by removable storage drive 810. As will be appreciated, the removable storage unit 820 includes a non-transitory computer readable medium having stored therein computer software and/or data.

The computer system 800 may also include a communications interface 812. Communications interface 812 allows software and data to be transferred between the computer system and external devices. Examples of communications interface 812 may include a modem, a network interface (such as an Ethernet card), a communications port, a PCM-CIA slot and card, etc. Software and data transferred via communications interface 812 are in the form of signals which may be, for example, electronic, electromagnetic, optical, or other signals capable of being received by communications interface 812.

In this document, the terms "computer program medium," "computer usable medium," and "computer readable medium" are used to generally refer to non-transitory media such as main memory 804, removable storage drive 820, a hard disk installed in hard disk drive 818. These computer program products are means for providing software to the computer system 800. The computer readable medium 820 allows the computer system 800 to read data, instructions, messages or message packets, and other computer readable information from the computer readable medium 820.

Therefore, while there has been described what is presently considered to be the preferred embodiment, it will understood by those skilled in the art that other modifications can be made within the spirit of the disclosure. The above description(s) of embodiment(s) is not intended to be exhaustive or limiting in scope. The embodiment(s), as described, were chosen in order to explain the principles of the disclosure, show its practical application, and enable those with ordinary skill in the art to understand how to make and use the disclosure. It should be understood that the disclosed subject matter is not limited to the embodiment(s) described above, but rather should be interpreted within the full meaning and scope of the appended claims.

The invention claimed is:

1. A method, comprising:
    building a location graph of a geographic location with nodes representing sites within the geographic location, wherein building the location graph comprises:
        building a geographical bounding box for the geographic location;
        dividing the geographical bounding box into a plurality of cells, wherein a size of each cell is associated with a walkable distance; and
        linking geographic neighboring cells of the plurality of cells to form the location graph;
    computing one or more pleasantness scores for the nodes, wherein computing the one or more pleasantness scores comprises processing tags associated with geo-tagged photos of the geographic location to capture words expressing at least one of emotional or cognitive perceptions of a node; and
    presenting a route on a map of the geographic location based upon the location graph and the one or more pleasantness scores.

2. The method of claim 1, comprising comparing a first pleasantness score of the one or more pleasantness scores to a second pleasantness score of the one or more pleasantness scores.

3. The method of claim 1, comprising weighting links between neighboring cells by a geographic distance between cell centroids.

4. The method of claim 1, wherein computing the one or more pleasantness scores comprises retrieving data about the nodes from a crowdsourcing website.

5. The method of claim 1, wherein the one or more words express emotional perceptions of the node.

6. The method of claim 1, wherein the one or more words express cognitive perceptions of the node.

7. The method of claim 1, wherein computing the one or more pleasantness scores comprises:
    computing a first pleasantness score for a first node of the nodes; and
    computing a second pleasantness score for a second node of the nodes.

8. The method of claim 1, wherein the route is from a source address to a destination address.

9. An information processing system, comprising:
    a processor device; and
    a memory operably coupled with the processor device, the memory comprising computer-executable instructions causing a computer to perform:
        building a location graph of a geographic location with nodes representing sites within the geographic location;
        computing one or more pleasantness scores for the nodes, wherein computing the one or more pleasantness scores comprises accessing geo-tagged photos of the geographic location and processing tags associated with the geo-tagged photos to capture words expressing at least one of emotional or cognitive perceptions of a node; and
    presenting a route on a map of the geographic location based upon the location graph and the one or more pleasantness scores.

10. The information processing system of claim 9, wherein the computer-executable instructions for computing the one or more pleasantness scores comprise gathering statistics for the geo-tagged photos to predict one or more scores for the node in association with one or more attributes, wherein the one or more attributes comprise at least one of quiet, happy, or beauty.

11. The information processing system of claim 10, wherein the computer-executable instructions comprise weighting links between neighboring cells associated with the location graph by a geographic distance between cell centroids.

12. The information processing system of claim 9, wherein the computer-executable instructions for computing the one or more pleasantness scores comprise retrieving data about the nodes from a crowdsourcing website.

13. The information processing system of claim 9, wherein the computer-executable instructions for computing the one or more pleasantness scores comprise gathering statistics for the geo-tagged photos to predict one or more scores for the node in association with one or more attributes.

14. The information processing system of claim 9, wherein the computer-executable instructions comprise:
    selecting the route from a source address to a destination address responsive to determining that one or more pleasantness scores associated with the route are higher than one or more other pleasantness scores; and
    presenting the route on the map of the geographic location.

15. The information processing system of claim 14, wherein the computer-executable instructions for selecting the route comprise selecting the route from amongst two or more routes comprising the route and a second route.

16. The information processing system of claim 15, wherein the second route is associated with at least one of the one or more other pleasantness scores.

17. A computer program product comprising a non-transitory computer-readable storage medium with computer-executable instructions stored thereon, the computer-executable instructions comprising:
    building a location graph of a geographic location with nodes representing sites within the geographic location;
    computing one or more pleasantness scores for the nodes, wherein computing the one or more pleasantness scores comprises accessing geo-tagged photos of the geographic location and processing tags associated with the geo-tagged photos to capture words expressing at least one of emotional or cognitive perceptions of a node;
    and
    presenting a route on a map of the geographic location based upon the location graph and the one or more pleasantness scores.

18. The computer program product of claim 17, wherein the computer-executable instructions for computing the one or more pleasantness scores comprise gathering statistics for the geo-tagged photos to predict one or more scores for the node in association with one or more attributes.

19. The computer program product of claim 18, wherein the computer-executable instructions comprise weighting links between neighboring cells associated with the location graph by a geographic distance between cell centroids.

20. The computer program product of claim 17, wherein the computer-executable instructions for computing the one or more pleasantness scores comprise retrieving data about the nodes from a crowdsourcing website.

\* \* \* \* \*